United States Patent
Ohsuge (10) Patent No.: US 7,539,157 B2
(45) Date of Patent: May 26, 2009

(54) COMMUNICATION SYSTEM AND TRANSMISSION POWER CONTROL METHOD

(75) Inventor: Michihiro Ohsuge, Tokyo (JP)

(73) Assignee: NEC Corporation, Tokyo (JP)

( * ) Notice: Subject to any disclaimer, the term of this patent is extended or adjusted under 35 U.S.C. 154(b) by 602 days.

(21) Appl. No.: 10/895,918

(22) Filed: Jul. 22, 2004

(65) Prior Publication Data

US 2005/0018705 A1   Jan. 27, 2005

(30) Foreign Application Priority Data

Jul. 23, 2003   (JP)   ............................. 2003-277944

(51) Int. Cl.
*H04W 4/00*   (2006.01)
*H04B 7/00*   (2006.01)
*H04B 1/00*   (2006.01)

(52) U.S. Cl. ........................ 370/328; 455/522; 455/69

(58) Field of Classification Search ................. 370/389, 370/335, 342, 347, 441, 491, 241, 328; 455/522, 455/525, 69–70

See application file for complete search history.

(56) References Cited

U.S. PATENT DOCUMENTS

| | | | | |
|---|---|---|---|---|
| 5,898,682 | A * | 4/1999 | Kanai .......................... | 370/331 |
| 6,373,823 | B1 * | 4/2002 | Chen et al. ................... | 370/252 |
| 6,603,971 | B1 * | 8/2003 | Mohebbi ...................... | 455/437 |
| 6,744,754 | B1 * | 6/2004 | Lee ............................. | 370/342 |
| 6,842,616 | B2 * | 1/2005 | Takano et al. ............ | 455/435.2 |
| 6,956,842 | B1 * | 10/2005 | Okumura et al. ............ | 370/350 |
| 7,027,420 | B2 * | 4/2006 | Hamalainen ................. | 370/335 |
| 7,146,142 | B1 * | 12/2006 | Raaf ........................ | 455/245.1 |
| 2002/0082038 | A1 * | 6/2002 | Mochizuki ................... | 455/522 |
| 2002/0160801 | A1 * | 10/2002 | Uesugi ........................ | 455/522 |
| 2002/0198014 | A1 * | 12/2002 | Miyamoto et al. .......... | 455/522 |
| 2003/0045321 | A1 * | 3/2003 | Kim et al. .................... | 455/522 |
| 2003/0100267 | A1 * | 5/2003 | Itoh et al. ...................... | 455/69 |
| 2003/0148780 | A1 * | 8/2003 | Takano ........................ | 455/522 |
| 2004/0157635 | A1 * | 8/2004 | Park et al. .................... | 455/522 |
| 2004/0248608 | A1 | 12/2004 | Kobayashi | |
| 2005/0186981 | A1 | 8/2005 | Nishio | |
| 2008/0014980 | A1 * | 1/2008 | Yano et al. .................. | 455/522 |

FOREIGN PATENT DOCUMENTS

| | | |
|---|---|---|
| JP | 2003-32184 | 1/2003 |
| JP | 2004-080531 A | 3/2004 |
| JP | 2005-005762 A | 1/2005 |
| WO | WO 00/48336 | 8/2000 |
| WO | WO 00/74289 A1 | 12/2000 |

OTHER PUBLICATIONS

Wang, Yiping et al., "Power Control Methods for Dedicated Control Channels During Discontinuous Transmission in IS-2000 Systems", Sep. 18, 2000, pp. 271-275.

* cited by examiner

*Primary Examiner*—Kwang B Yao
*Assistant Examiner*—Candal Elpenord
(74) *Attorney, Agent, or Firm*—Foley & Lardner LLP (57) ABSTRACT

In absence of user data, a bit extracting portion 6 treats pilot bits as pseudo user data and delivers the pilot bits to a pilot converting portion 7. The pilot converting portion 7 carries out symbol rotation with reference to a bit pattern in case where CRC bits alone are transmitted. Those symbols are decoded by a deinterleaving portion 8 and an error correcting portion 9. A CRC judging portion 10 carries out CRC judgment.

13 Claims, 12 Drawing Sheets

RECEIVING SIDE (8) RECEPTION SYMBOL SEQUENCE (9) DELETION OF PILOT SYMBOL (10) DEINTERLEAVING

COMMUNICATION SYSTEM AND TRANSMISSION POWER CONTROL METHOD

This application claims priority to prior Japanese application JP 2003-277944, the disclosure of which is incorporated herein by reference.

BACKGROUND OF THE INVENTION

This invention relates to a communication system and a transmission power control method and, in particular, to an outer-loop transmission power control method in a CDMA (Code Division Multiple Access) communication system.

In a CDMA communication system, excessive transmission power to a receiving side results in an increase in interference with other receiving parties and a decrease in line capacity. It is therefore necessary to always carry out transmission with transmission power optimum for the receiving side. To this end, inner-loop transmission power control and outer-loop transmission power control are carried out in combination in the receiving side. In the inner-loop transmission power control, power control is carried out at a high speed by transmitting a TPC (Transmit Power Control) bit per slot from the receiving side to a transmitting side so that a reception SIR (Signal-to-Interference power Ratio) is equal to a target SIR. In the outer-loop transmission power control, the target SIR in the inner-loop transmission power control is controlled in the receiving side so as to keep a constant error rate, such as FER (frame error rate) and a BLER (block error rate), representative of a line quality.

However, in a service, such as packet communication, in which transmission and reception of data are not continuously carried out, CRC (cyclic redundancy check) results for the data can not always be measured. This leaves a time period during which the line quality can not be measured and the outer-loop transmission power control can not be carried out.

In order to avoid the above-mentioned problem, CRC bits alone are continuously transmitted from the transmitting side to a user even if there is no user data. In this manner, quality measurement is possible. In this case, however, redundant bits (that is, the CRC bits) are transmitted exclusively for the purpose of quality measurement for the outer-loop transmission power control. For other users, an interference is increased. As a result, the line capacity is disadvantageously decreased.

On the other hand, in the inner-loop transmission power control, a SIR of an object channel must be measured. Therefore, pilot bits, which are generally known symbols, must simultaneously be used. Accordingly, even if there is no user data, the pilot bits, the TPC bits, and the CRC bits must be transmitted.

This is because the pilot bits for use in SIR measurement and the CRC bits for use in measurement of the line quality separately exist.

Now, referring to FIGS. 1 through 4, description will be made of an example of transmitting and receiving operations in a related communication system of the type in case where there is no user data.

Judgment of presence or absence of the user data can be realized by using control bits indicative of presence or absence of data and a data length, in addition to the pilot bits. However, description thereof is omitted herein and the operation when absence of the user data is judged will only be described. Description of the TPC bits for the inner-loop transmission power control is also omitted herein. A bit length, an interleaving length, and the number of pilot bits are given specific values In the following description but, not being limited thereto, may have any values.

Figure 1:
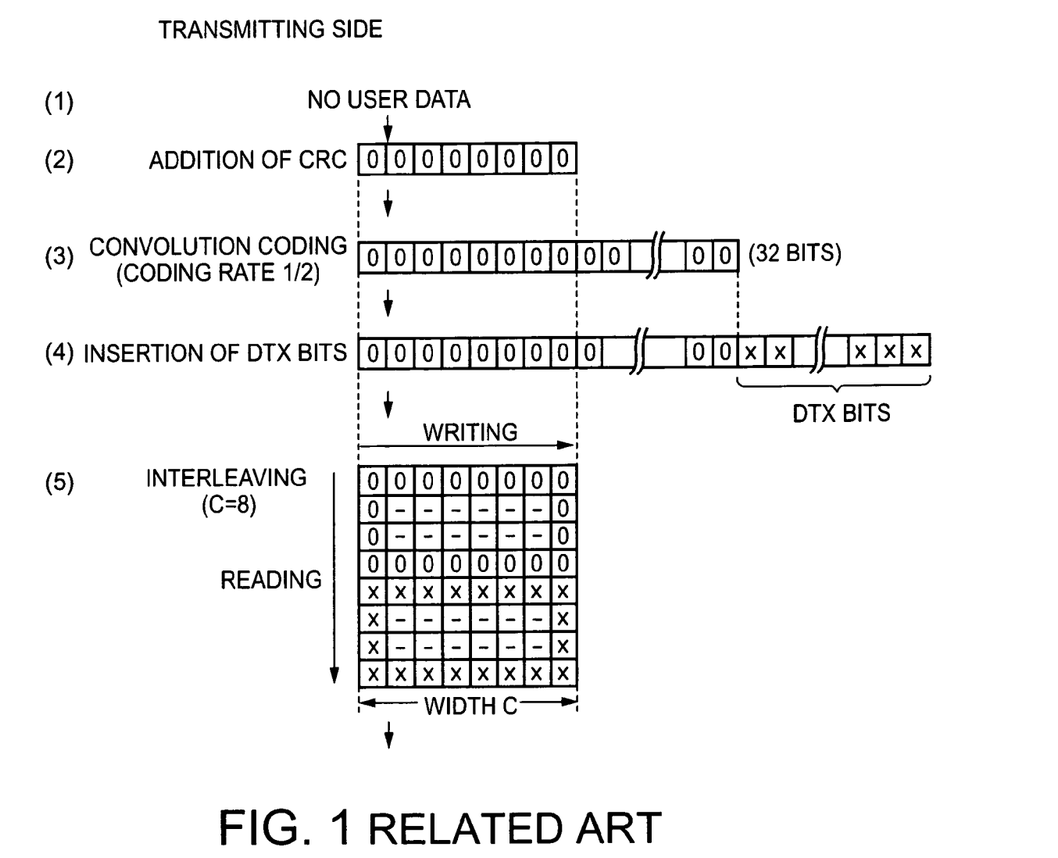
FIG. 1 is a view for describing a first half of a transmitting operation in a related communication system.
Figure 2:
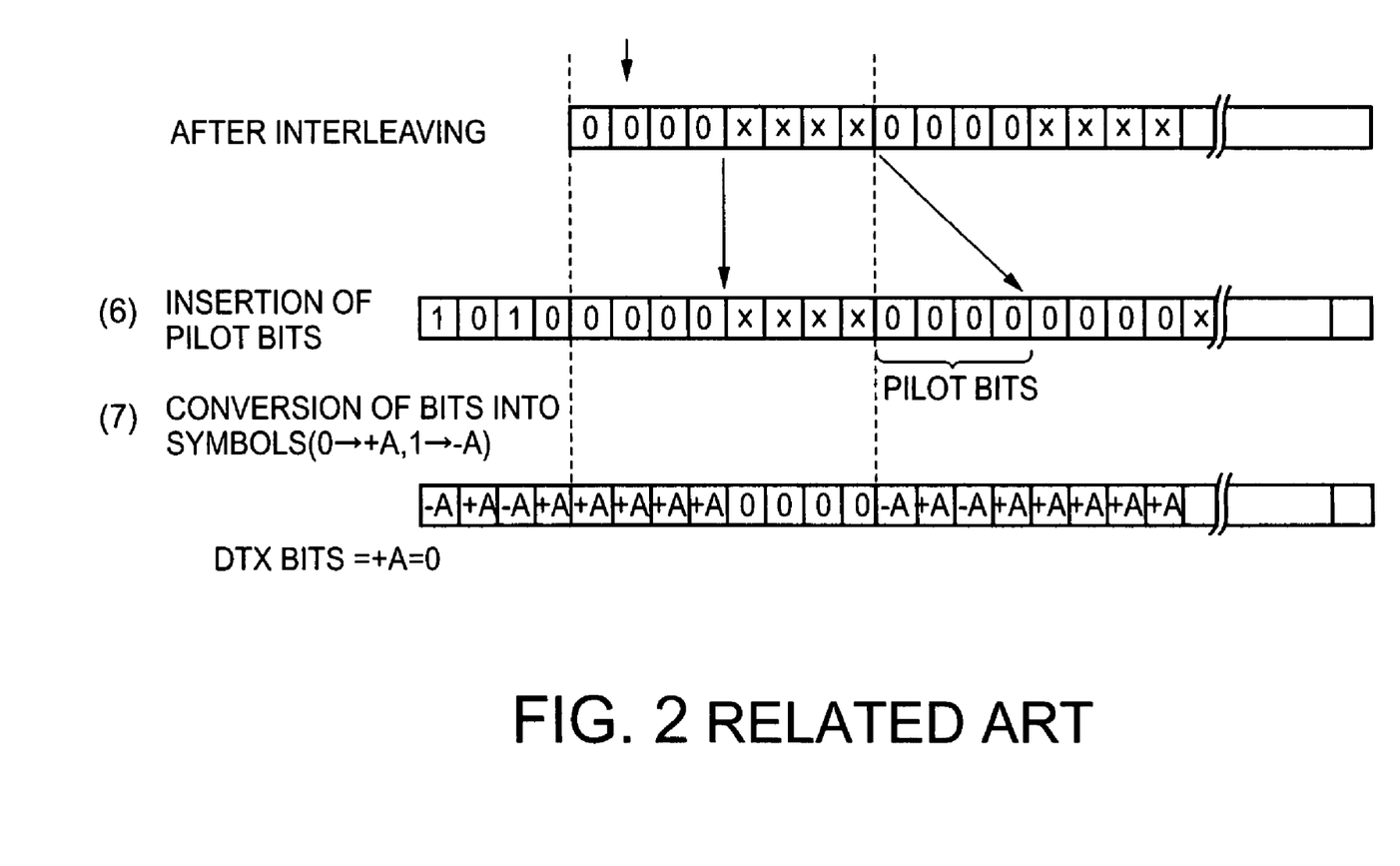
FIG. 2 is a view for describing the second half of the transmitting operation.

Referring to FIGS. 1 and 2, an operation at a transmitting side is as follows.

(1) There is no user data to be transmitted.

(2) CRC parity bits alone are added. By way of example, the CRC parity bits of 8 bits all of which are "0" bits are added.

(3) The CRC parity bits are coded. By way of example, convolution coding at a coding rate of 1/0.2 is carried out. In the illustrated example, a data sequence of 8 bits is coded into 32 bits. In the illustrated example, in case where 8 bits all of which are "0" bits are coded, 32 bits obtained after coding are all "0" bits.

(4) In order to match a frame length, DTX (Discontinuous Transmission) bits are inserted. The DTX bits represent that the transmission power is adjusted to "0" upon transmission. In the illustrated example, the DTX bits of 32 bits are inserted.

(5) An interleaving operation is carried out. In the illustrated example, the interleaving operation when C=8 is carried out. As illustrated in the figures, by writing in a horizontal direction and reading in a vertical direction, the order of a bit sequence is changed.

(6) After the interleaving operation, pilot bits of 4 bits are inserted per 8 bits. In the illustrated example, a repetitive pattern "1010" is shown. However, any other known pattern may be used.

(7) In order to carry out modulation such as phase modulation, those bits are converted into symbols. In the illustrated example, "0" bits are converted into symbols "+A" and "1" bits are converted into symbols "−A". Herein, "A" represents an amplitude. The DTX bits are converted into symbols "0" so that the amplitude is "0".

After the above-mentioned operation upon transmission bits, modulation such as phase modulation is carried out to obtain a modulated symbol sequence. Then, the modulates symbol sequence is transmitted from a base station as a radio wave. Practically, spreading is carried out in CDMA communication. However, description thereof is omitted herein.

Figure 3:
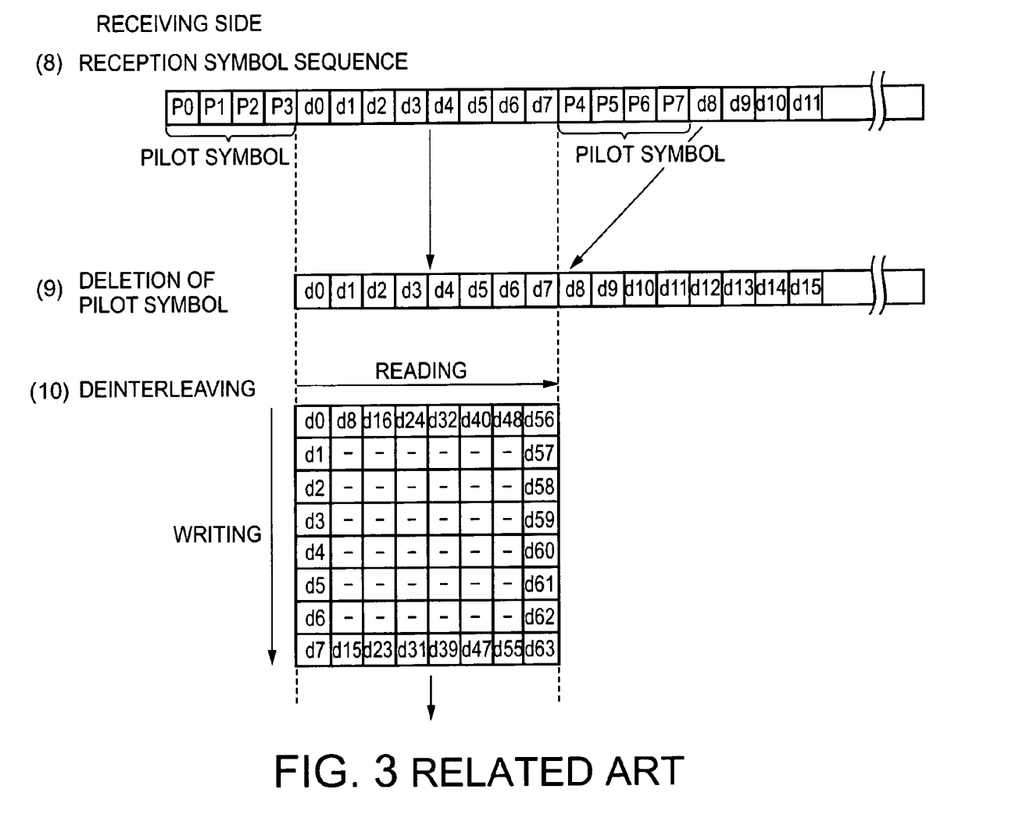
FIG. 3 is a view for describing a first half of a receiving operation in the related communication system.
Figure 4:
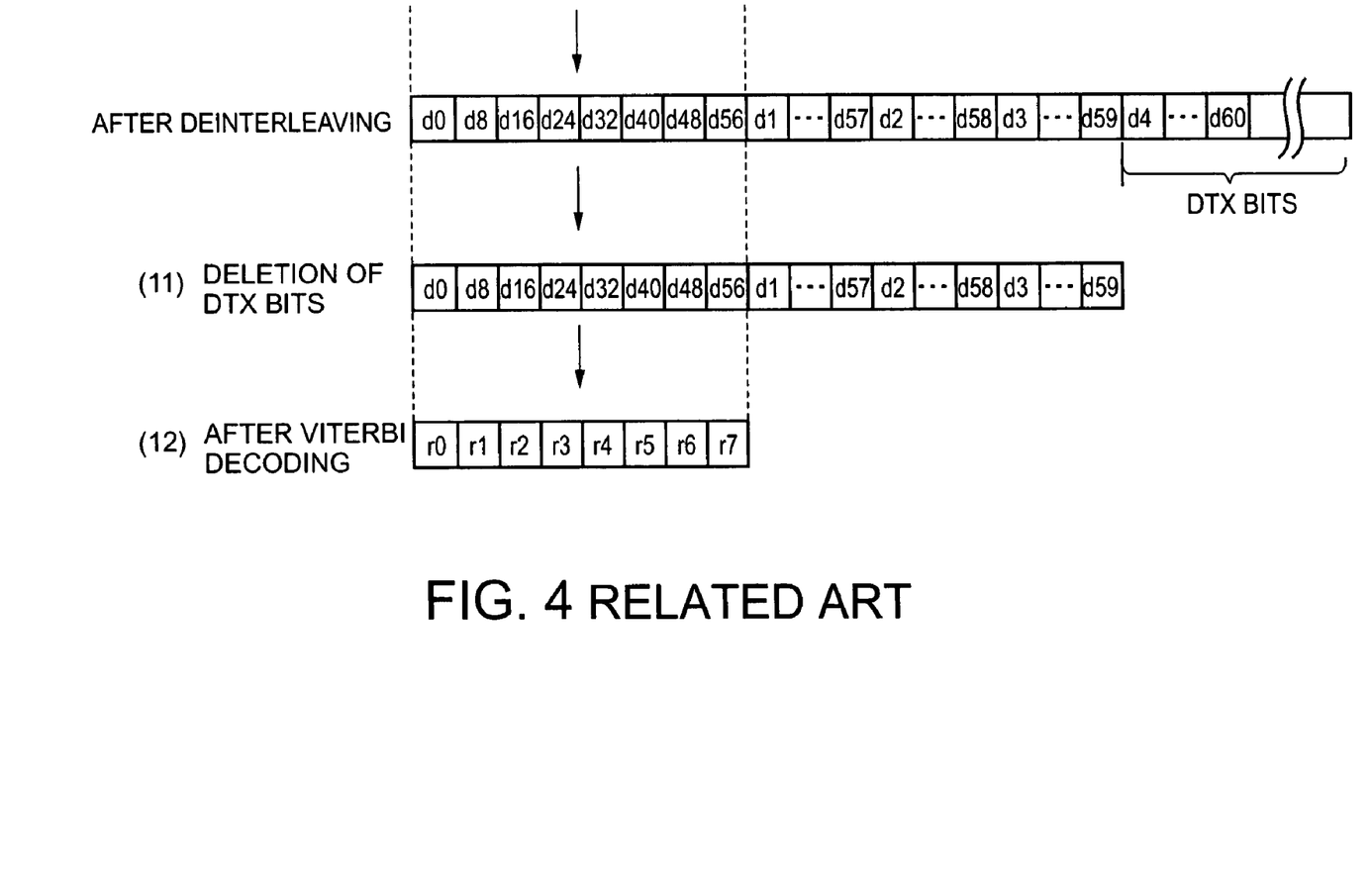
FIG. 4 is a view for describing a second half of the receiving operation.

Next referring to FIGS. 3 and 4, an operation at a receiving side will be described.

(8) By demodulating the radio wave from the base station as a phase-modulated wave, a reception symbol sequence is obtained.

(9) In the reception symbol sequence, a pilot symbol part is used in SIR measurement and a demodulating operation. However, the pilot symbol part is not used in a data decoding operation subsequently carried out and, therefore, is removed.

(10) By carrying out an operation reverse to that described in (5), a deinterleaving operation is carried out to recover the order of the data sequence into an initial order.

(11) The DTX bits are deleted. In the illustrated example, the bit length is assumed to be known. Actually, however, the bit length can be calculated by control bits representative of presence or absence of data and a data length.

(12) The convolution-coded bit sequence is decoded. Generally, the Viterbi algorithm is known in which soft-decision decoding is carried out.

If 8 bit data comprising "0" bits alone are recovered by the above-mentioned procedure, the result of CRC judgment is normal (OK). If at least one bit is in error, the result of CRC judgment is abnormal (NG).

Japanese Patent Application Publication (JP-A) No. 2003-32184 discloses another control of a target SIR following variation in propagation environment in an outer-loop control.

In a service, such as packet communication, in which data transmission and reception are not continuously carried out, it is a general practice that the CRC bits are continuously transmitted to carry out quality measurement. In this case, however, redundant bits (that is, the CRC bits) are transmitted exclusively for the purpose of quality measurement for the outer-loop transmission power control. For other users, an interference is increased. As a result, the line capacity is disadvantageously decreased.

SUMMARY OF THE INVENTION

It is therefore an object of this invention to provide a communication system and a transmission power control method which are capable of maintaining a predetermined line quality in a service in which data transmission and reception are not continuously carried out.

According to this invention, there is provided a communication system in which communication is carried out from a transmitting side to a receiving side by the use of a pilot signal known to the transmitting side and the receiving side and added to information, the communication system comprising line quality judging means, in the receiving side, for treating the pilot signal received by the receiving side as pseudo user data and judging a line quality on the basis of the pseudo user data if the information comprises no user data.

According to this invention, there is also provided a transmission power control method used in a communication system in which communication is carried out from a transmitting side to a receiving side by the use of a pilot signal known to the transmitting side and the receiving side and added to information, the method comprising a line quality judging step of treating the pilot signal received by the receiving side as pseudo user data and judging a line quality on the basis of the pseudo user data if the information contains no user data.

DESCRIPTION OF THE PREFERRED EMBODIMENT

Now, description will be made about a gist of this invention with reference to the drawing.

This invention provides a structure of an outer-loop power control system and an outer-loop power control method which are used in a CDMA communication system having an outer-loop transmission power control function and which are capable of maintaining a predetermined line quality by measuring a block error rate by using pilot bits and controlling a target SIR, even in a service such as packet communication in which data transmission and reception are not continuously carried out.

Figure 5:
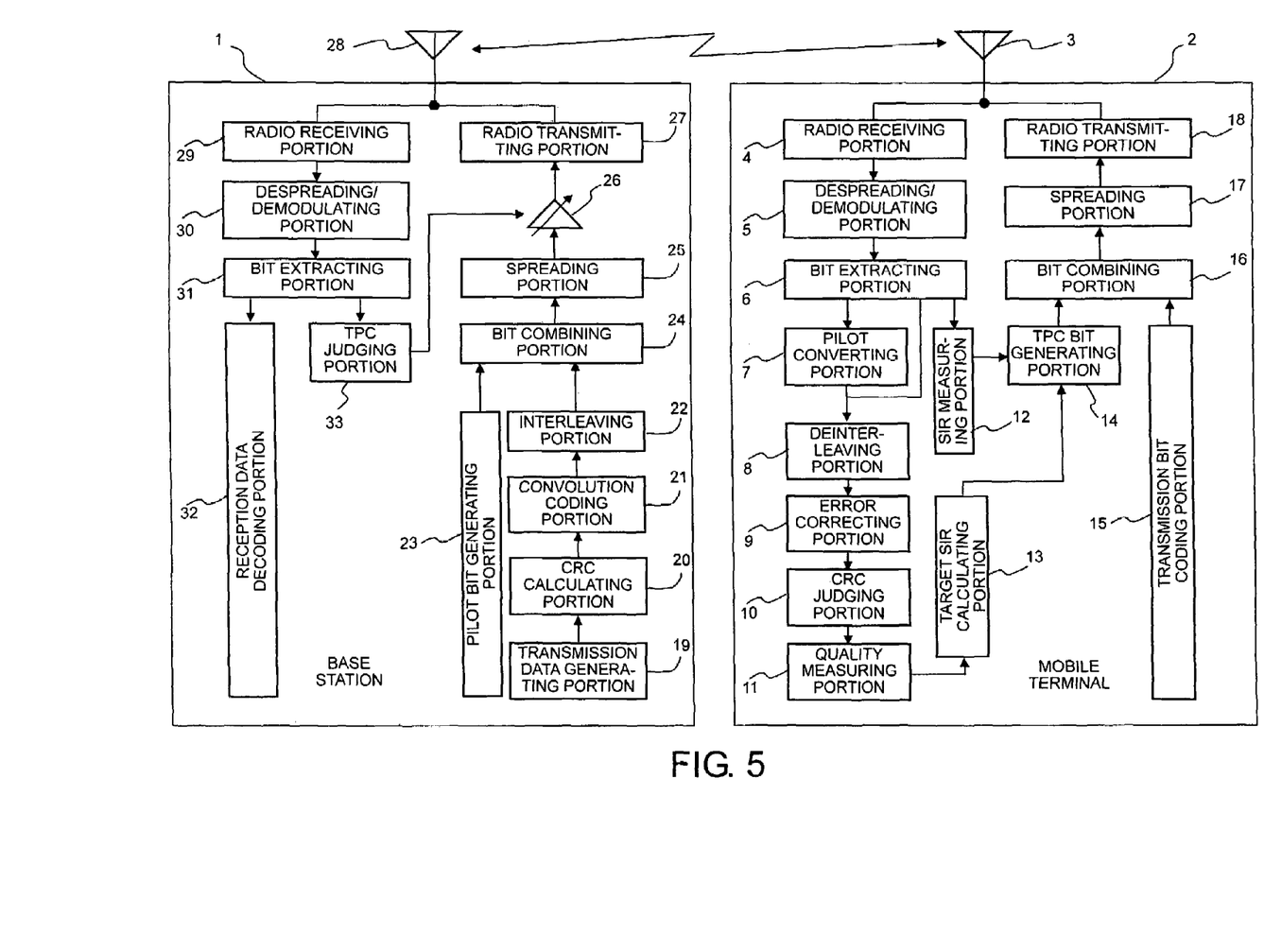
FIG. 5 is a view showing a communication system according to an embodiment of this invention.

At first referring to FIG. 5, an outer-loop transmission power control system according to an embodiment of this invention is used in CDMA communication.

A base station 1 transmits a transmission signal to a mobile terminal 2. The transmission signal comprises user data and pilot bits as a symbol pattern known to the mobile terminal 2 and has a slot structure corresponding to an interleaving length at an interleaving portion 22. The transmission signal is received by an antenna 3 and a radio receiving portion 4 of the mobile terminal 2. The transmission signal is demodulated by a despreading/demodulating portion 5 into a demodulated bit sequence.

In outer-loop power control, two kinds of operations are switched in dependence upon presence or absence of the user data in the demodulated bit sequence. In absence of the user data, the pilot bits are extracted by a bit extracting portion 6 and delivered to a pilot converting portion 7 as pseudo user data. The pilot converting portion 7 carries out symbol rotation with reference to a bit pattern in case where CRC bits alone are transmitted. Those symbols are decoded by a deinterleaving portion 8 and an error correcting portion 9 into a decoded signal. The decoded signal is subjected to CRC judgment by a CRC judging portion 10.

In presence of the user data, the bit extracting portion 6 delivers the user data except the pilot bits to the deinterleaving portion 8. Thereafter, the CRC judgment is carried out in the manner similar to that mentioned above.

A quality measuring portion 11 counts the result of the CRC judgment for a predetermined time period to measure a block error rate. If the block error rate thus measured does not satisfy a predetermined desired quality, a target SIR set in a TPC generating portion 14 is increased by a target SIR calculating portion 13. If an excessively high quality is obtained, the target SIR is decreased by the target SIR calculating portion 13.

In the above-mentioned manner, a predetermined line quality can be maintained by the outer-loop power control using the pilot bits even in absence of the user data.

According to this invention, the communication system includes line quality judging means for treating the pilot signal received by the receiving side as pseudo user data and judging a line quality on the basis of the pseudo user data if the information received by the receiving side contains no user data. Therefore, excessive transmission bits can be decreased and a line capacity can be increased. Further, a stable outer-loop operation can be carried out. Since the line quality is continuously monitored even if the user data are not transmitted, a reception performance is improved.

As a first effect of this invention, it is possible to reduce average transmission power at the base station. This is because the pilot bits alone are transmitted in absence of the user data.

As a second effect, communication is stabilized and, therefore, the receptioni performance is improved. This is because the line quality can continuously be measured with reference to the pilot bits.

As a third effect, the line capacity of the system is increased. This is because an interference to other users can be decreased by reducing the average transmission power at the base station.

Description will proceed to an embodiment of this invention with reference to the drawing.

By the use of the slot structure in which the pilot bits of a known pattern transmitted per slot are arranged in conformity with the interleaving length in error correction, it is possible to provide a communication system and a transmission power control method which are capable of using the pilot bits and the CRC bits in common.

Referring to FIG. 5, the outer-loop power control system according to the embodiment of this invention comprises the base station 1 and the mobile terminal 2.

The base station 1 comprises a transmission data generating portion 19, a CRC calculating portion 20, a convolution coding portion 21, the interleaving portion 22, a pilot bit generating portion 23, a bit combining portion 24, a spreading portion 25, a transmission power adjusting portion 26, a radio transmitting portion 27, an antenna 28, a radio receiving portion 29, a despreading/demodulating portion 30, a bit extracting portion 31, a reception data decoding portion 32, and a TPC judging portion 33.

The mobile terminal 2 comprises the antenna 3, the radio receiving portion 4, the despreading/demodulating portion 5, the bit extracting portion 6, the pilot converting portion 7, the deinterleaving portion 8, the error correcting portion 9, the CRC judging portion 10, the quality measuring portion 11, a SIR measuring portion 12, a target SIR calculating portion 13, the TPC bit generating portion 14, a transmission bit coding portion 15, a bit combining portion 16, a spreading portion 17, and a radio transmitting portion 18.

The above-mentioned portions are generally operated in the following manner. At first, description will be made of an operation of transmitting transmission data from the base station 1 to the mobile terminal 2.

The transmission data generating portion 19 generates user data. The CRC calculating portion 20 carries out CRC calculation to add CRC bits to the user data. CRC calculation is possible in absence of the user data. In this embodiment, however, the CRC bits are not added in absence of the user data.

The convolution coding portion 21 codes the user data with the CRC bits added thereto into coded data for the purpose of error correction. In this embodiment, the coded data are obtained by convolution coding but may be obtained by turbo coding or the like.

Figure 6:
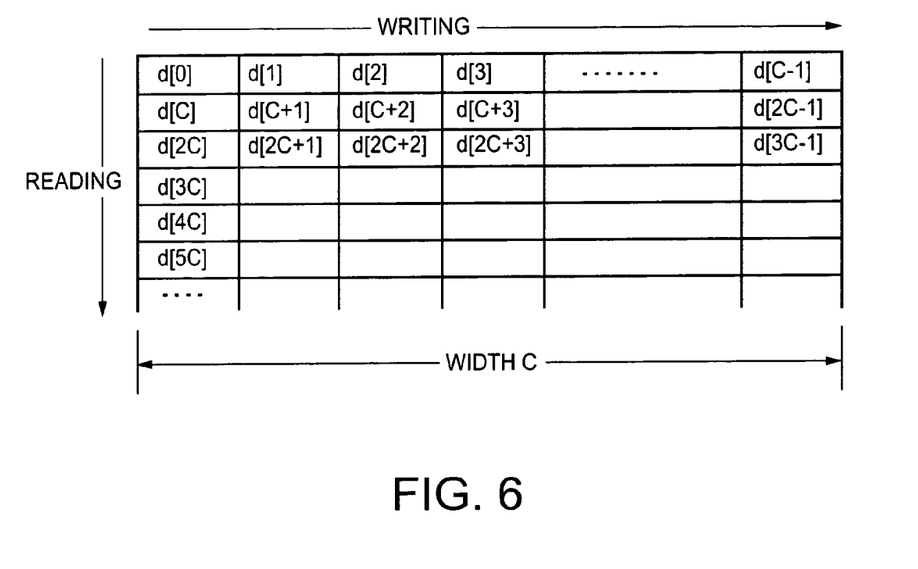
FIG. 6 is a view for describing an interleaving operation.

The interleaving portion 22 writes the coded data in a horizontal direction into an arrangement having a width C as illustrated in FIG. 6 and reads the coded data in a vertical direction to produce interleaved user data. Generally, it is known that, by rearranging the data at the interleaving portion 22, errors occurring in a radio section can be distributed and an error correction ability can be improved.

The pilot bit generating portion 23 generates a pilot bit sequence comprising pilot bits as a preselected pilot pattern. The preselected pilot pattern is preliminarily set in the mobile terminal 2 also. The pilot pattern is not subjected to convolution coding or an interleaving operation.

Figure 7:
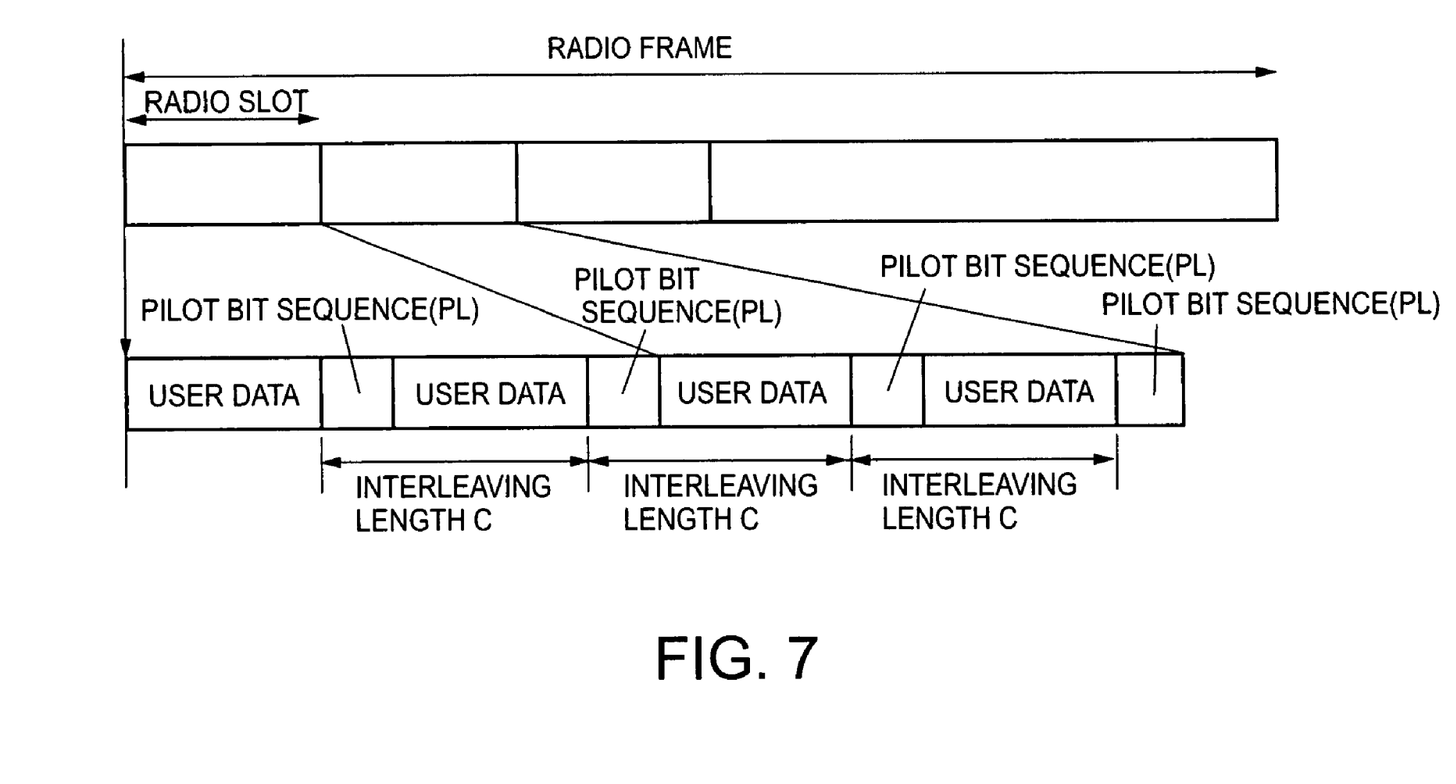
FIG. 7 is a view for describing insertion of pilot bits.
Figure 8:
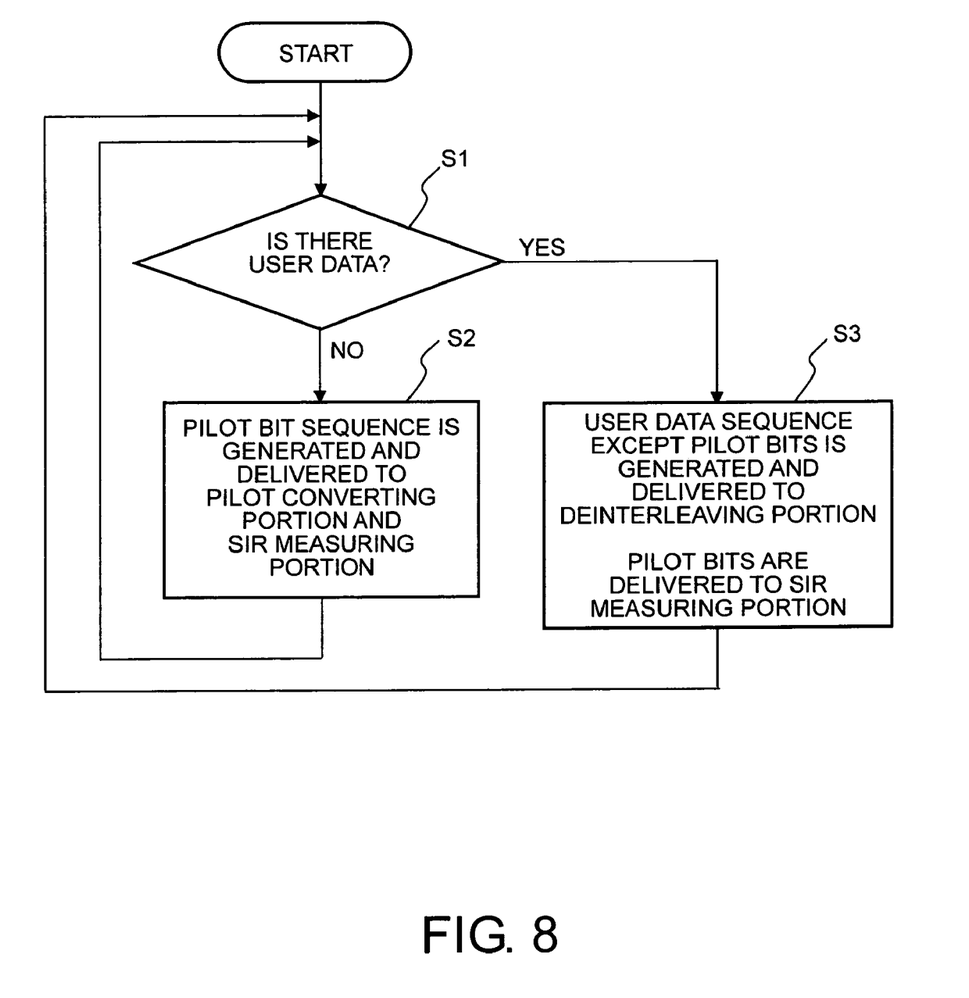
FIG. 8 is a flow chart for describing an operation of a bit extracting portion in the communication system illustrated in FIG. 5.

The bit combining portion 24 is supplied with the pilot bits generated by the pilot bit generating portion 23 and the interleaved user data generated by the interleaving portion 22 and combines the pilot bits and the interleaved user data to produce a combined data sequence having a slot structure illustrated in FIG. 7. Herein, the pilot bit sequence comprises a plurality of bits on the order of several bits. As seen from FIG. 7, a plurality of pilot bit sequences are arranged at an interval corresponding to the interleaving length (C in FIG. 6). The interval is equivalent to that in case where the CRC bits alone are convolution coded and interleaved. In absence of the user data in a user data part in a particular section, transmission of the particular section is stopped.

The combined data sequence is subjected to spreading in the spreading portion 25 and adjusted in transmission power by the transmission power adjusting portion 26. Thereafter, the data sequence is converted by the radio transmitting portion 27 into a high-frequency signal which is transmitted through the antenna 28 as a radio wave.

The CRC calculation, the convolution coding, and the spreading are techniques well known to those skilled in the art and are not directly related to the characteristics of this invention. Therefore, detailed description thereof is omitted herein.

Next, description will be made of an operation of the mobile terminal 2 receiving the data from the base station 1.

The radio wave is received by the antenna 3 and demodulated through the radio receiving portion 4 and the despreading/demodulating portion 5 into the bit sequence.

The bit extracting portion 6 switches its operation depending upon presence or absence of the user data. In absence of the user data, the pilot bits whose pattern is known to the mobile terminal 2 as the receiving side are delivered to the pilot converting portion 7 as pseudo user data.

In presence of the user data, the bit extracting portion 6 delivers the user data except the pilot bits to the deinterleaving portion 8. The bit extracting portion 6 delivers the pilot bit sequence alone to the SIR measuring section 12 irrespective of presence or absence of the user data.

The pilot converting portion 7 carries out symbol rotation with reference to a bit pattern in case where CRC bits alone are transmitted. In case of phase modulation (BPSK: binary phase shift keying) by way of example, a symbol is rotated or converted from 0 into 1 by inverting a sign of the symbol or rotating the symbol by 180 degrees.

The deinterleaving portion 8 recovers the order of the bit sequence into the initial order by an operation reverse to the interleaving operation shown in FIG. 6. Specifically, by writing in the vertical direction and reading in the horizontal direction in the arrangement in FIG. 6, the bit sequence of the initial order is recovered to obtain a convolution coded bit sequence.

The error correcting portion 9 decodes the convolution coded bit sequence into a decoded data sequence. The CRC judging portion 10 carries out CRC judgment to judge whether or not an error occurs in the decoded data sequence.

The quality measuring portion 11 measures a BLER by counting the result of the CRC judgment for a predetermined time period. If the BLER thus measured does not reach a predetermined desired quality, the target SIR preliminarily set in the TPC generating portion 14 is increased by the target SIR calculating portion 13. If an excessive quality is obtained, the target SIR is decreased by the target SIR calculating portion 13.

The SIR measuring portion 12 measures a SIR of an object channel with reference to the pilot bits. In order to measure SIR, a plurality of methods are known to those skilled in the art. Therefore, a specific method of measuring the SiR is not described herein.

Further, description will be made of an operation of the base station 1 transmitting the data from the mobile station 1.

If the SIR measured by the SIR measuring portion 12 is greater than the target SIR preliminarily selected, the TPC bit generating portion 14 generates a TPC bit for decreasing transmission power at the base station 1. If the SIR measured by the SIR measuring portion 12 is smaller than the target SIR, the TPC bit generating portion 14 generates a TPC bit for increasing the transmission power at the base station 1.

The bit combining portion 16 bit-combines the TPC bit thus generated and the user data generated the transmission coding portion 15 to produce a combined data sequence. The combined data sequence is converted by the spreading portion 17 and the radio transmitting portion 18 into a high-frequency signal which is transmitted through the antenna 3 to the base station 1.

Finally, description will be made of an operation of the base station 1 receiving the data from the mobile station 2.

The high-frequency signal is received and demodulated by the antenna 28, the radio receiving portion 29, and the despreading/demodulating portion 30 into demodulated data. The demodulated data are separated by the bit extracting portion 31 into the user data and the TPC bit. The user data are decoded by the reception data decoding portion 32.

The TPC judging portion 33 demodulates the TPC bit. With reference to transmission power increasing/decreasing information represented by the TPC bit, the transmission power adjusting portion 26 controls the transmission power.

Next referring to FIGS. 5 and 9, an overall operation of this embodiment will be described in detail.

At first, inner-loop power control is carried out in the following manner. The SIR measuring portion 12 measures the SIR of a reception signal as the reception SIR by the use of the pilot bits. The TPC bit generating portion 14 compares the target SIR preliminarily selected and the reception SIR. If the reception SIR does not reach the target SIR, the TPC bit generating portion 14 generates the TPC bit increasing the transmission power at the base station 1. If the reception SIR higher than the target SIR is measured, the TPC bit generating portion 14 generates the TPC bit decreasing the transmission power.

The TPC bit is spread by the spreading portion 17 and transmitted through the radio transmitting portion 18 and the antenna 3 to the base station 1. Responsive to the TPC bit, the base station 1 controls the transmission power in accordance with the content of the TPC bit.

In the outer-loop power control, two kinds of operations are switched in dependence upon the operation of the bit extracting portion 6. Judgment is made about presence or absence of the user data in the reception signal (step S1 in FIG. 9).

In absence of the user data (No in step S1), the bit extracting portion 6 treats as pseudo user data the pilot bits of an individual physical channel, whose pattern is known to the receiving side, and delivers the pilot bits to the pilot converting portion 7 and the SIR measuring portion 12 (step S2).

In presence of the user data (Yes in step S2), the bit extracting portion 6 delivers the user data except the pilot bits to the deinterleaving portion 8 (step S3). In the step S3, the bit extracting portion 6 also delivers the pilot bits to the SIR measuring portion 12.

The pilot converting portion 7 carries out the symbol rotation with reference to the bit pattern in case where the CRC bits alone are transmitted. Thereafter, the deinterleavig portion 8 and the error correcting portion 9 carries out a decoding operation. The CRC judging portion 10 carries out the CRC judgment.

The quality measuring portion 11 measures a block error rate by counting the result of the CRC judgment for a predetermined time period. If the BLER thus measured does not reach a predetermined desired quality, the target SIR preliminarily set in the TPC generating portion 14 is increased by the target SIR calculating portion 13. If an excessive quality is obtained, the target SIR is decreased by the target SIR calculating portion 13.

In the above-mentioned manner, it is possible to perform the outer-loop power control in order to maintain a predetermined line quality even in a section without the user data.

In order to judge presence or absence of the user data, use may be made of two methods which will presently be described. As a first method, the base station 1 transmits control bits indicative of presence or absence of data and the number of data, in addition to the pilot bits. By the use of the control bit, judgment is made. As a second method, measurement is made of a power ratio between the user data and the pilot bit sequence. If the reception level of the user data is lower than that of the pilot bit sequence by a predetermined value or by a greater value greater than the predetermined value, it is judged that the user data are not transmitted.

Next, an operation of the embodiment of this invention will be described in detail. In the following, a transmitting operation and a receiving operation in absence of the user data will be described.

Figure 9:
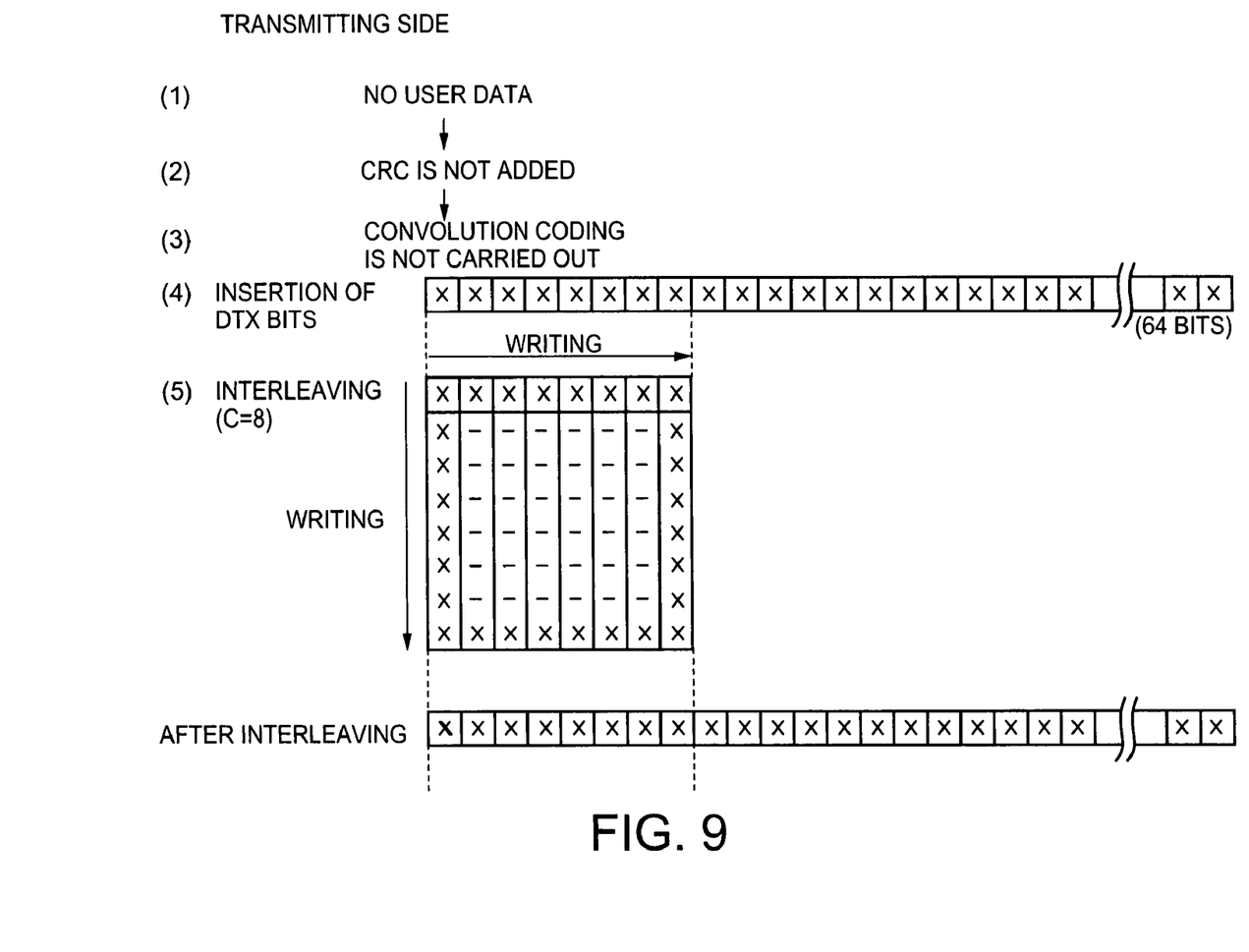
FIG. 9 is a view for describing a first half of a transmitting operation of the communication system illustrated in FIG. 5.
Figure 10:
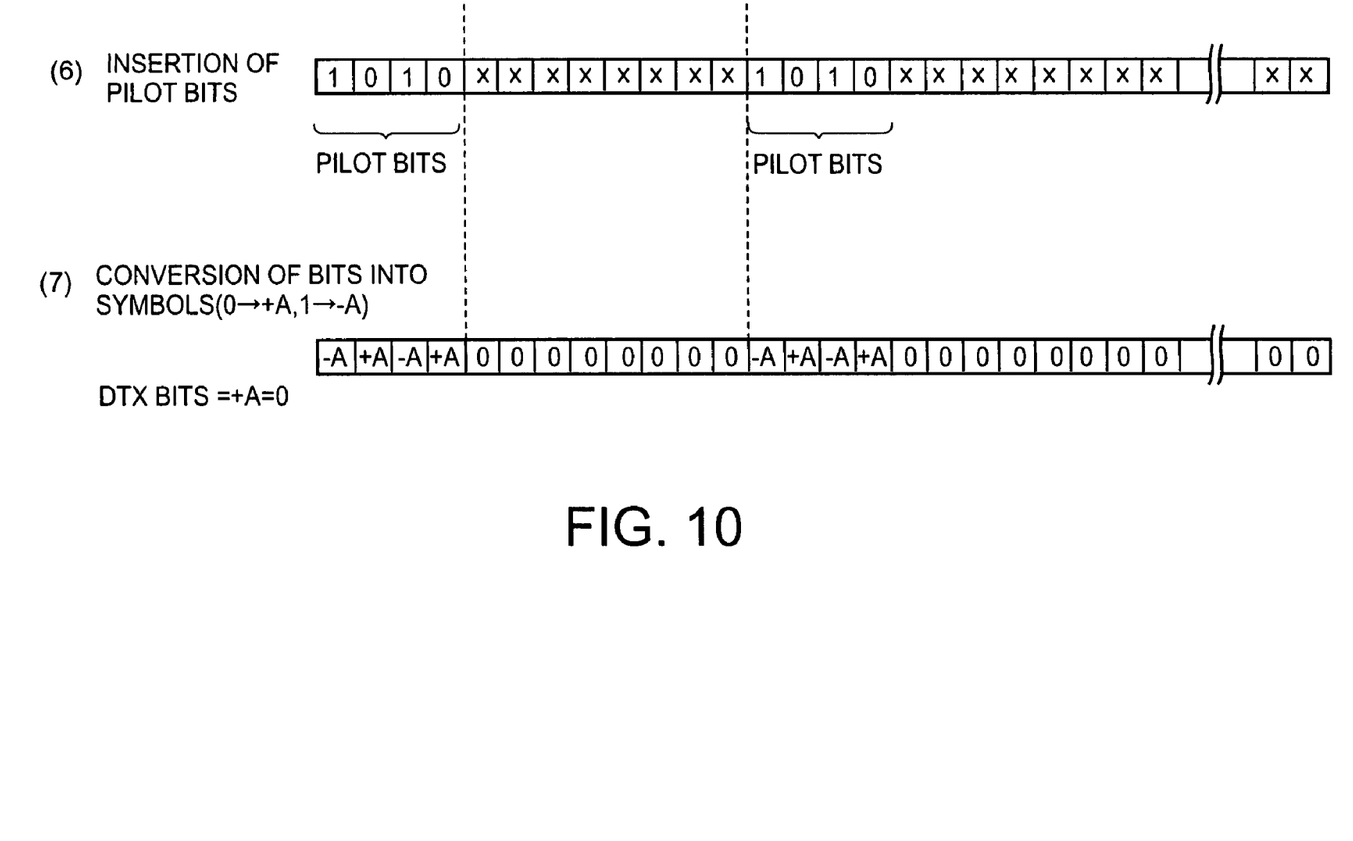
FIG. 10 is a view for describing a second half of the transmitting operation.

Referring to FIGS. 9 and 10, an operation at the transmitting side is as follows (1) There is no user data to be transmitted.

(2) No CRC bit is added.

(3) Because of no user data, convolution coding is not carried out.

(4) In order to match a frame length, DTX (Discontinuous Transmission) bits are inserted. The DTX bits represent that the transmission power is adjusted to "0" upon transmission. In this embodiment, the DTX bits of 64 bits are inserted.

(5) The interleaving operation is carried out by writing in a horizontal direction into an arrangement having a width C (for example, C=8) and reading in a vertical direction. In this embodiment, all bits are the DTX bits. As a result, all bits after rearrangement are the DTX bits also.

(6) After the interleaving operation, pilot bits of 4 bits are inserted per every 8 bits. This is similar to the related art. In this embodiment, the pilot bits of 4 bits have a pattern "1010" in which "1" and "0" are alternately repeated.

(7) In the manner similar to the related art, those bits are converted into symbols so as to carry out modulation such as phase modulation. In this embodiment, "0" bits are converted into "+A" and "1" bits are converted into "−A" by way of example. Herein, "A" represents an amplitude. The DTX bits are replaced by symbols "0" so that the amplitude is "0". After the above-mentioned operation upon transmission bits, modulation such as phase modulation is carried out to obtain a modulated symbol sequence. Then, the base station transmits the modulated symbol sequence as a phase-modulated radio wave.

Figure 11:
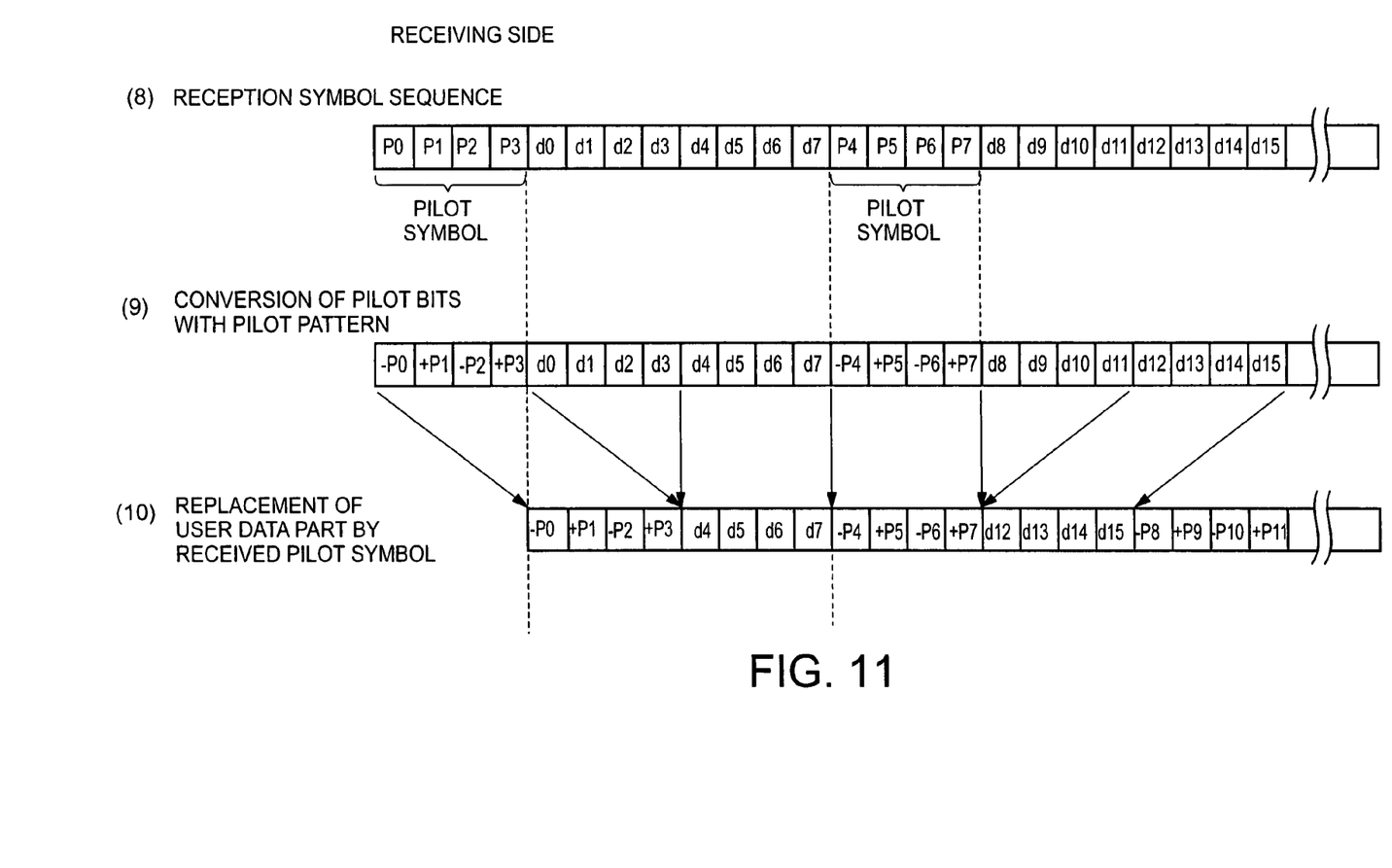
FIG. 11 is a view for describing a first half of a receiving operation of the communication system illustrated in FIG. 5.
Figure 12:
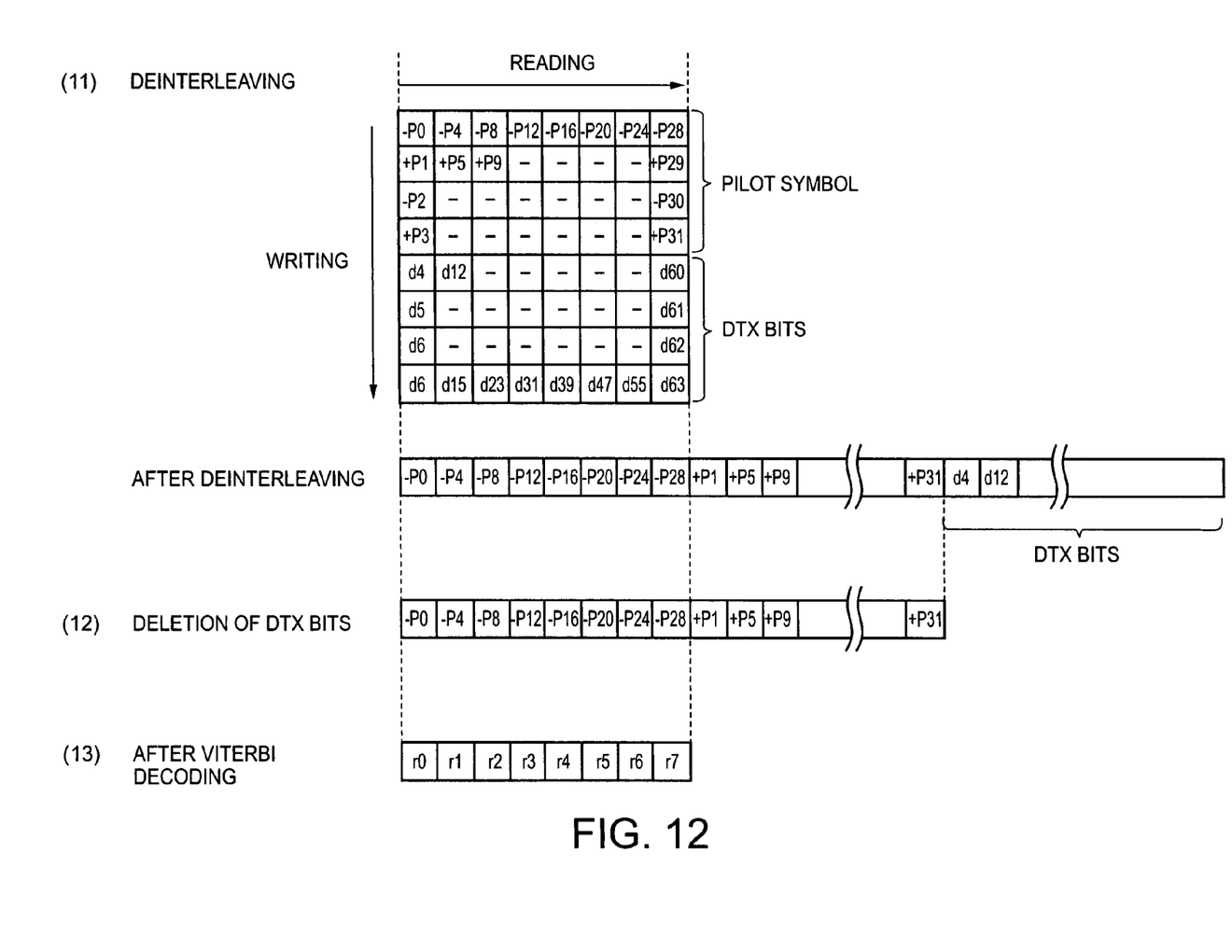
FIG. 12 is a view for describing a second half of the receiving operation.

Referring to FIGS. 11 and 12, the operation at the receiving side will be described.

(8) The phase-modulated radio wave from the base station is demodulated to obtain a reception symbol sequence.

(9) Reception symbols in a pilot part are converted by the use of the pattern "1010" known to the receiving side. If the bit of the known pilot pattern is "1", the reception symbol is multiplied by "−1". If the bit of the known pilot pattern is "0", the reception symbol is left unchanged. By this operation, the pattern "1010" can be converted into a converted pilot part equivalent to reception of the pattern "0000". Therefore, the converted pilot part can be used as a substitute for the CRC parity bits of all "0" bits in the related art.

(10) The user data part is partly replaced by the converted pilot part as shown in (10) in FIG. 11. In the illustrated example, d0, d1, d2, d3 and the like are replaced by the pilot part. d0, d1, d2, d3 and the like correspond to the DTX bits at the transmitting side. Therefore, no data are obtained even if d0, d1, d2, and d3 and the like are demodulated. Therefore, d0, d1, d2, d3 and the like are unnecessary.

(11) As shown in (11) in FIG. 12, a deinterleaving operation is carried out. This is similar to the related art. That is, writing in the vertical direction into the arrangement having a width C (for example, C=8) and reading in the horizontal direction are carried out.

(12) Like in the related art., the DTX bits are removed. By this operation, an entire bit sequence is a converted pilot symbol part in this embodiment.

(13) A decoding operation is carried out by the use of the Viterbi algorithm or the like. If 8 bit data comprising all "0" are recovered by the above-mentioned procedure, the result of the CRC judgment is normal (OK). If at least one bit is in error, the result of the CRC judgment is abnormal (NG).

In the first and the second embodiments, the pilot bits are used. Alternatively, any other appropriate control bits may be used, for example, TFCI (Transport Format Combination Indicator) bits representative of presence or absence of data and the size of data. In the first and the second embodiments, the outer-loop power control for transmission from the base station 1 alone is described. However, this invention is applicable to outer-loop power control for transmission from the mobile terminal 2.

While this invention has thus far been described in conjunction with the preferred embodiments thereof, it will be readily possible for those skilled in the art to put this invention into practice in various other manners without departing from the scope set forth in the appended claims.

What is claimed is:

1. A communication system in which communication is carried out from a transmitting side to a receiving side by the use of a pilot signal known to said transmitting side and said receiving side and added to information to be transmitted, the communication system comprising:
   receiving means, in said receiving side, for receiving the pilot signal transmitted by said transmitting side; and
   line quality judging means, in said receiving side, for treating the pilot signal received by the receiving means as pseudo user data and judging a line quality on the basis of the pseudo user data if the information comprises no user data,
   wherein a signal transmitted by the transmitting side is a signal interleaved in a predetermined cycle, said line quality judging means comprising a bit extracting portion for judging whether or not the information received by the receiving side contains the user data and extracting the received pilot signal as the pseudo user data if the user data are not contained, a pilot converting portion responsive to the pilot signal from said bit extracting portion for carrying out data conversion of the pilot signal by the use of the pilot signal known to the receiving side into a converted pilot signal and arranging the converted pilot signal at an interval corresponding to an interleaving length, a deinterleaving portion for deinterleaving the information processed by the pilot converting portion to produce deinterleaved information, an error correcting portion for decoding the deinterleaved information processed by the deinterleaving portion to produce decoded information, and an error judging portion for judging an error in the decoded information processed by the error correcting portion, and
   wherein, when the information contains no user data, the deinterleaving portion deinterleaves the pseudo user data corresponding to the pilot signal, and wherein, when the information contains user data, the deinterleaving portion deinterleaves the user data and does not deinterleave the data corresponding to the pilot signal.

2. A communication system as claimed in claim 1, wherein, at the transmitting side, a predetermined bit generally required for error judgment at the receiving side is not added if the information to be transmitted contains no user data.

3. A communication system as claimed in claim 1, wherein said communication system is a CDMA communication system.

4. A communication system as claimed in claim 3, wherein the line quality is judged in order to carry out outer-loop transmission power control.

5. A transmission power control method used in a communication system in which communication is carried out from a transmitting side to a receiving side by the use of a pilot signal known to the transmitting side and the receiving side and added to information to be transmitted, the method comprising:
   a receiving step of receiving, by said receiving side, the pilot signal transmitted by said transmitting side;
   a line quality judging step of treating the pilot signal received by the receiving side in the receiving step as pseudo user data and judging a line quality on the basis of the pseudo user data if the information comprises no user data;
   when the information contains no user data, deinterleaving the pseudo user data corresponding to the pilot signal; and
   when the information contains user data, deinterleaving the user data and not deinterleaving the data corresponding to the pilot signal,
   wherein a signal transmitted by the transmitting side is a signal interleaved in a predetermined cycle, said line quality judging step comprising a bit extracting step of judging whether or not the information received by the receiving side contains the user data and extracting the received pilot signal as the pseudo user data if the user data are not contained, a pilot converting step of receiving the pilot signal from said bit extracting step, carrying out data conversion of the pilot signal by the use of the pilot signal known to the receiving side into a converted pilot signal, and arranging the converted pilot signal at an interval corresponding to an interleaving length, a deinterleaving step of deinterleaving the information processed by the pilot converting step to produce deinterleaved information, an error correcting step of decoding the deinterleaved information processed by the deinterleaving step to produce decoded information, and an error judging step of judging an error in the decoded information processed by the error correcting step.

6. A transmission power control method as claimed in claim 5, wherein, at the transmitting side, a predetermined bit generally required for error judgment at the receiving side is not added if the information to be transmitted contains no user data.

7. A transmission power control method as claimed in claim 5, wherein said communication system is a CDMA communication system.

8. A transmission power control method as claimed in claim 7, wherein the line quality is judged in order to carry out outer-loop transmission power control.

9. A communication system as claimed in claim 1, wherein the judging of the line quality, by the line quality judging means, on the basis of the pseudo user data if the information comprises no user data, is performed by checking how many of a plurality of bits of the pilot signal, which correspond to the pseudo-user data, match a predetermined pattern of bits.

10. A transmission power control method as claimed in claim 5, wherein the judging of the line quality, in the line quality judging step, on the basis of the pseudo user data if the information comprises no user data, is performed by checking how many of a plurality of bits of the pilot signal, which correspond to the pseudo-user data, match a predetermined pattern of bits.

11. A transmission power control method as claimed in claim 6, wherein the predetermined bit generally required for error judgment at the receiving side corresponds to a cyclic redundancy check bit.

12. A communication system as claimed in claim 2, wherein when the predetermined bit generally required for error judgment at the receiving side is not added at the transmitting side, error correction is not capable of being performed at the receiving side.

13. A transmission power control method as claimed in claim 6, wherein when the predetermined bit generally required for error judgment at the receiving side is not added at the transmitting side, error correction is not capable of being performed at the receiving side.

* * * * *